(12) United States Patent
Hampson et al.

(10) Patent No.: US 9,469,747 B2
(45) Date of Patent: *Oct. 18, 2016

(54) MINERAL WOOL INSULATION

(75) Inventors: Carl Hampson, St. Helens (GB); Gert Mueller, New Palestine, IN (US); Charles Appley, Cumberland, IN (US)

(73) Assignees: Knauf Insulation SPRL, Vise (BE); Knauf Insulation, Inc., Shelbyville, IN (US)

( * ) Notice: Subject to any disclaimer, the term of this patent is extended or adjusted under 35 U.S.C. 154(b) by 210 days.

This patent is subject to a terminal disclaimer.

(21) Appl. No.: 12/671,922

(22) PCT Filed: Aug. 1, 2008

(86) PCT No.: PCT/EP2008/060178
§ 371 (c)(1),
(2), (4) Date: Apr. 15, 2011

(87) PCT Pub. No.: WO2009/019232
PCT Pub. Date: Feb. 12, 2009

(65) Prior Publication Data
US 2011/0260094 A1  Oct. 27, 2011

(30) Foreign Application Priority Data

Aug. 3, 2007 (GB) .................................. 0715100.4
Apr. 29, 2008 (GB) .................................. 0807777.8
Jun. 6, 2008 (GB) .................................. 0810297.2

(51) Int. Cl.
| | | |
|---|---|---|
| *E04B 1/74* | (2006.01) |
| *D04H 3/00* | (2012.01) |
| *C08K 5/17* | (2006.01) |
| *C08L 99/00* | (2006.01) |
| *C08L 101/06* | (2006.01) |
| *D04H 1/4218* | (2012.01) |
| *C09D 201/06* | (2006.01) |
| *C09D 199/00* | (2006.01) |
| *E04B 1/76* | (2006.01) |
| *C03C 25/32* | (2006.01) |
| *C03C 25/34* | (2006.01) |
| *C08L 101/02* | (2006.01) |
| *C09D 197/02* | (2006.01) |
| *C09D 201/02* | (2006.01) |
| *C08H 8/00* | (2010.01) |
| *C08L 97/02* | (2006.01) |
| *D04H 1/4209* | (2012.01) |
| *D04H 1/64* | (2012.01) |
| *C09K 3/00* | (2006.01) |

(52) U.S. Cl.
CPC ............... *C08K 5/175* (2013.01); *C03C 25/32* (2013.01); *C03C 25/321* (2013.01); *C03C 25/34* (2013.01); *C08H 8/00* (2013.01); *C08L 97/02* (2013.01); *C08L 99/00* (2013.01); *C08L 101/025* (2013.01); *C08L 101/06* (2013.01); *C09D 197/02* (2013.01); *C09D 199/00* (2013.01); *C09D 201/025* (2013.01); *C09D 201/06* (2013.01); *C09K 3/00* (2013.01); *D04H 1/4209* (2013.01); *D04H 1/4218* (2013.01); *D04H 1/64* (2013.01); *E04B 1/7658* (2013.01); *E04B 1/7662* (2013.01)

(58) Field of Classification Search
CPC .. C08L 97/02; C08L 101/025; C08L 101/06; C08L 99/00; C08L 2666/02; C03C 25/32; C03C 25/321; C03C 25/34; C03C 17/28; C08H 8/00; C09D 197/02; C09D 199/00; C09D 201/025; C09D 201/06; C09K 3/00; D04H 1/42; D04H 1/64; D04H 1/4209; D04H 1/4218; D04H 1/587; D04H 1/641; C08K 5/175; C08K 7/14; C08K 3/40; E04B 1/7658; E04B 1/7662; E04B 1/78; E04B 1/84; Y10T 428/31971; Y10T 442/60; Y10T 442/691
USPC ............... 106/217.6, 217.9; 427/384
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny et al. |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace |
| 2,261,295 A | 11/1941 | Schlack |
| 2,362,086 A | 11/1944 | Eastes |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd |
| 3,231,349 A | 1/1966 | Stalego |
| 3,232,821 A | 2/1966 | Moore et al. |
| 3,297,419 A | 1/1967 | Eyre |
| 3,513,001 A | 5/1970 | Woodhead |
| 3,551,365 A | 12/1970 | Matalon |
| 3,784,408 A | 1/1974 | Jaffe |
| 3,791,807 A * | 2/1974 | Etzel et al. ............. 65/451 |
| 3,802,897 A | 4/1974 | Voigt et al. |
| 3,809,664 A | 5/1974 | Fanta et al. |
| 3,826,767 A | 7/1974 | Hoover et al. |
| 3,856,606 A | 12/1974 | Fan et al. |
| 3,867,119 A * | 2/1975 | Kasuga et al. ............. 65/498 |
| 3,907,724 A | 9/1975 | Higginbottom |
| 3,911,048 A | 10/1975 | Vargiu et al. |
| 3,919,134 A | 11/1975 | Higginbottom |
| 3,922,466 A | 11/1975 | Bell |
| 3,955,031 A | 5/1976 | Jones |
| 3,956,204 A | 5/1976 | Higginbottom |
| 3,961,081 A | 6/1976 | McKenzie |
| 3,971,807 A | 7/1976 | Brack |
| 4,014,726 A * | 3/1977 | Fargo ............. 156/167 |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons |
| 4,097,427 A | 6/1978 | Aitken et al. |
| 4,107,379 A | 8/1978 | Stofko |
| 4,109,057 A | 8/1978 | Nakamura |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew |
| 4,186,053 A | 1/1980 | Krasnobajew |
| 4,201,857 A | 5/1980 | Krasnobajew |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan et al. |
| 4,714,727 A | 12/1987 | Hume, III |
| 4,720,295 A | 1/1988 | Bronshtein |
| 4,754,056 A | 6/1988 | Ansel et al. |
| 4,761,184 A | 8/1988 | Markessini |
| 4,780,339 A | 10/1988 | Lacourse |
| 4,828,643 A | 5/1989 | Newman |
| 4,845,162 A | 7/1989 | Schmitt et al. |
| 4,906,237 A | 3/1990 | Johansson et al. |
| 4,912,147 A | 3/1990 | Pfoehler et al. |
| 4,918,861 A | 4/1990 | Carpenter |
| 4,923,980 A | 5/1990 | Blomberg |
| 4,950,444 A | 8/1990 | Deboufie |
| 4,988,780 A | 1/1991 | Das |
| 4,992,519 A | 2/1991 | Mukherjee |
| 5,001,202 A | 3/1991 | Denis |
| 5,013,405 A | 5/1991 | Izard |
| 5,037,930 A | 8/1991 | Shih |
| 5,041,595 A | 8/1991 | Yang et al. |
| 5,089,342 A | 2/1992 | Dhein |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton |
| 5,143,582 A | 9/1992 | Arkens |
| 5,151,465 A | 9/1992 | Le-Khac |
| 5,167,738 A | 12/1992 | Bichot |
| 5,198,492 A | 3/1993 | Stack |
| 5,217,741 A | 6/1993 | Kawachi |
| 5,218,048 A | 6/1993 | Abe |
| 5,240,498 A | 8/1993 | Matalon |
| 5,278,222 A | 1/1994 | Stack |
| 5,300,144 A | 4/1994 | Adams |
| 5,300,192 A | 4/1994 | Hansen |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga |
| 5,340,868 A | 8/1994 | Strauss et al. |
| 5,352,480 A | 10/1994 | Hansen |
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset |
| 5,424,418 A | 6/1995 | Duflot |
| 5,434,233 A | 7/1995 | Kiely et al. |
| 5,447,977 A | 9/1995 | Hansen |
| 5,470,843 A | 11/1995 | Stahl |
| 5,480,973 A | 1/1996 | Goodlad et al. |
| 5,492,756 A | 2/1996 | Seale |
| 5,498,662 A | 3/1996 | Tanaka et al. |
| 5,534,612 A | 7/1996 | Taylor |
| 5,536,766 A | 7/1996 | Seyffer et al. |
| 5,538,783 A | 7/1996 | Hansen |
| 5,543,215 A | 8/1996 | Hansen |
| 5,545,279 A | 8/1996 | Hall |
| 5,547,541 A | 8/1996 | Hansen et al. |
| 5,547,745 A | 8/1996 | Hansen |
| 5,550,189 A | 8/1996 | Qin |
| 5,554,730 A | 9/1996 | Woiszwillo |
| 5,562,740 A | 10/1996 | Cook |
| 5,571,618 A | 11/1996 | Hansen et al. |
| 5,578,678 A | 11/1996 | Hartmann et al. |
| 5,580,856 A | 12/1996 | Prestrelski |
| 5,582,682 A | 12/1996 | Ferretti |
| 5,583,193 A | 12/1996 | Aravindakshan et al. |
| 5,589,256 A | 12/1996 | Hansen |
| 5,589,536 A | 12/1996 | Golino |

| | | | | | | |
|---|---|---|---|---|---|---|
| 5,607,759 | A | 3/1997 | Hansen | 6,340,411 B1 | 1/2002 | Hansen |
| 5,608,011 | A | 3/1997 | Eck | 6,348,530 B1 | 2/2002 | Reck |
| 5,609,727 | A | 3/1997 | Hansen et al. | 6,365,079 B1 | 4/2002 | Winkler |
| 5,614,570 | A | 3/1997 | Hansen et al. | 6,372,077 B1 | 4/2002 | Tecle |
| 5,620,940 | A | 4/1997 | Birbara et al. | 6,379,739 B1 | 4/2002 | Formanek et al. |
| 5,621,026 | A | 4/1997 | Tanaka et al. | 6,395,856 B1 | 5/2002 | Petty et al. |
| 5,633,298 | A | 5/1997 | Arfaei et al. | 6,403,665 B1 | 6/2002 | Sieker |
| 5,641,561 | A | 6/1997 | Hansen | 6,407,225 B1 | 6/2002 | Mang |
| 5,643,978 | A | 7/1997 | Darwin et al. | 6,410,036 B1 | 6/2002 | De Rosa |
| 5,645,756 | A | 7/1997 | Dubin et al. | 6,440,204 B1 | 8/2002 | Rogols et al. |
| 5,660,904 | A | 8/1997 | Andersen | 6,461,553 B1 | 10/2002 | Hansen |
| 5,661,213 | A | 8/1997 | Arkens et al. | 6,468,442 B2 | 10/2002 | Bytnar |
| 5,670,585 | A | 9/1997 | Taylor | 6,468,730 B2 | 10/2002 | Fujiwara et al. |
| 5,672,418 | A | 9/1997 | Hansen | 6,469,120 B1 | 10/2002 | Elfersy |
| 5,672,659 | A | 9/1997 | Shalaby | 6,475,552 B1 | 11/2002 | Shah |
| 5,690,715 | A | 11/1997 | Schiwek | 6,482,875 B2 | 11/2002 | Lorenz et al. |
| 5,691,060 | A | 11/1997 | Levy | 6,495,656 B1 | 12/2002 | Haile et al. |
| 5,693,411 | A | 12/1997 | Hansen et al. | 6,521,339 B1 | 2/2003 | Hansen |
| 5,719,092 | A | 2/1998 | Arrington | 6,525,009 B2 | 2/2003 | Sachdev et al. |
| 5,719,228 | A | 2/1998 | Taylor | 6,538,057 B1 | 3/2003 | Wildburg |
| 5,756,580 | A | 5/1998 | Natori et al. | 6,547,867 B2 | 4/2003 | Rogols |
| 5,763,524 | A | 6/1998 | Arkens | 6,555,616 B1 | 4/2003 | Helbing |
| 5,788,243 | A | 8/1998 | Harshaw | 6,559,302 B1 | 5/2003 | Shah |
| 5,788,423 | A | 8/1998 | Perkins | 6,562,267 B1 | 5/2003 | Hansen |
| 5,807,364 | A | 9/1998 | Hansen | 6,596,103 B1 | 7/2003 | Hansen |
| 5,855,987 | A | 1/1999 | Margel et al. | 6,613,378 B1 | 9/2003 | Erhan et al. |
| 5,863,985 | A | 1/1999 | Shalaby | 6,638,882 B1 | 10/2003 | Helbing et al. |
| 5,885,337 | A | 3/1999 | Nohr et al. | 6,638,884 B2 | 10/2003 | Quick et al. |
| 5,895,804 | A | 4/1999 | Lee et al. | 6,699,945 B1 | 3/2004 | Chen |
| 5,905,115 | A | 5/1999 | Luitjes | 6,706,853 B1 | 3/2004 | Stanssens |
| 5,916,503 | A | 6/1999 | Rettenbacher | 6,719,862 B2 | 4/2004 | Quick |
| 5,919,528 | A | 7/1999 | Huijs | 6,730,730 B1 | 5/2004 | Hansen |
| 5,919,831 | A | 7/1999 | Philipp | 6,753,361 B2 | 6/2004 | Kroner et al. |
| 5,922,403 | A | 7/1999 | Tecle | 6,818,694 B2 * | 11/2004 | Hindi et al. .................. 524/446 |
| 5,925,722 | A | 7/1999 | Exner et al. | 6,821,547 B2 | 11/2004 | Shah |
| 5,929,184 | A | 7/1999 | Holmes-Farley et al. | 6,852,247 B2 | 2/2005 | Bytnar |
| 5,929,196 | A | 7/1999 | Kissel | 6,858,074 B2 | 2/2005 | Anderson et al. |
| 5,932,344 | A | 8/1999 | Ikemoto et al. | 6,861,495 B2 | 3/2005 | Barsotti et al. |
| 5,932,665 | A | 8/1999 | DePorter et al. | 6,864,044 B2 | 3/2005 | Ishikawa et al. |
| 5,932,689 | A | 8/1999 | Arkens et al. | 6,878,800 B2 | 4/2005 | Husemoen |
| 5,942,123 | A | 8/1999 | McArdle | 6,884,849 B2 | 4/2005 | Chen |
| 5,954,869 | A | 9/1999 | Elfersy | 6,955,844 B2 | 10/2005 | Tagge et al. |
| 5,977,224 | A | 11/1999 | Cheung et al. | 6,962,714 B2 | 11/2005 | Hei |
| 5,977,232 | A | 11/1999 | Arkens et al. | 6,989,171 B2 | 1/2006 | Portman |
| 5,981,719 | A | 11/1999 | Woiszwillo et al. | 6,992,203 B2 | 1/2006 | Trusovs |
| 5,983,586 | A | 11/1999 | Berdan, II et al. | 7,018,490 B2 | 3/2006 | Hansen |
| 5,990,216 | A | 11/1999 | Cai et al. | 7,029,717 B1 | 4/2006 | Ojima et al. |
| 5,993,709 | A | 11/1999 | Bonomo | 7,067,579 B2 | 6/2006 | Taylor et al. |
| 6,022,615 | A | 2/2000 | Rettenbacher | 7,083,831 B1 | 8/2006 | Koch |
| 6,067,821 | A | 5/2000 | Jackson | 7,090,745 B2 | 8/2006 | Beckman et al. |
| 6,071,549 | A | 6/2000 | Hansen | 7,141,626 B2 | 11/2006 | Rodrigues et al. |
| 6,071,994 | A | 6/2000 | Hummerich | 7,144,474 B1 | 12/2006 | Hansen |
| 6,072,086 | A | 6/2000 | James et al. | 7,195,792 B2 | 3/2007 | Boston et al. |
| 6,077,883 | A | 6/2000 | Taylor et al. | 7,201,778 B2 | 4/2007 | Smith et al. |
| 6,090,925 | A | 7/2000 | Woiszwillo et al. | 7,201,825 B2 | 4/2007 | Dezutter |
| 6,114,033 | A | 9/2000 | Ikemoto et al. | 7,202,326 B2 | 4/2007 | Kuroda |
| 6,114,464 | A | 9/2000 | Reck et al. | 7,241,487 B2 | 7/2007 | Taylor |
| 6,133,347 | A | 10/2000 | Vickers, Jr. | 7,458,235 B2 | 12/2008 | Beaufils |
| 6,136,916 | A | 10/2000 | Arkens et al. | 7,514,027 B2 | 4/2009 | Horres |
| 6,139,619 | A | 10/2000 | Zaretskiy | 7,655,711 B2 | 2/2010 | Swift |
| 6,143,243 | A | 11/2000 | Gershun | 7,772,347 B2 | 8/2010 | Swift |
| 6,171,444 | B1 | 1/2001 | Nigam | 7,795,354 B2 | 9/2010 | Srinivasan |
| 6,171,654 | B1 | 1/2001 | Salsman et al. | 7,803,879 B2 | 9/2010 | Srinivasan |
| 6,180,037 | B1 | 1/2001 | Anderson | 7,807,771 B2 | 10/2010 | Swift |
| 6,194,512 | B1 | 2/2001 | Chen | 7,842,382 B2 | 11/2010 | Helbing |
| 6,210,472 | B1 | 4/2001 | Kwan et al. | 7,854,980 B2 | 12/2010 | Jackson |
| 6,221,958 | B1 | 4/2001 | Shalaby | 7,883,693 B2 | 2/2011 | Sehl |
| 6,221,973 | B1 | 4/2001 | Arkens et al. | 7,888,445 B2 | 2/2011 | Swift |
| 6,231,721 | B1 | 5/2001 | Quick | 7,947,765 B2 | 5/2011 | Swift |
| 6,274,661 | B1 | 8/2001 | Chen | 8,114,210 B2 | 2/2012 | Hampson |
| 6,281,298 | B1 | 8/2001 | Papsin, Jr. | 8,182,648 B2 | 5/2012 | Swift |
| 6,299,677 | B1 | 10/2001 | Johnson | 8,211,923 B2 | 7/2012 | Wagner |
| 6,299,936 | B1 | 10/2001 | Reck | 8,372,900 B2 | 2/2013 | Shooshtari |
| 6,307,732 | B1 | 10/2001 | Tsubaki | 8,377,564 B2 | 2/2013 | Shooshtari |
| 6,310,227 | B1 | 10/2001 | Sarama et al. | 8,501,838 B2 | 8/2013 | Jackson |
| 6,313,102 | B1 | 11/2001 | Colaco et al. | 8,680,224 B2 | 3/2014 | Zhang |
| 6,319,683 | B1 | 11/2001 | James et al. | 8,691,934 B2 | 4/2014 | Helbing |
| 6,331,350 | B1 | 12/2001 | Taylor et al. | 8,900,495 B2 | 12/2014 | Pacorel |
| 6,331,513 | B1 | 12/2001 | Zaid | 2001/0017427 A1 | 8/2001 | Rosthauser |

| | | |
|---|---|---|
| 2001/0046824 A1 | 11/2001 | Nigam |
| 2002/0000100 A1 | 1/2002 | Burg |
| 2002/0025435 A1 | 2/2002 | Hansen |
| 2002/0026025 A1 | 2/2002 | Kuo |
| 2002/0028857 A1 | 3/2002 | Holy |
| 2002/0032253 A1 | 3/2002 | Lorenz et al. |
| 2002/0042473 A1 | 4/2002 | Trollsas |
| 2002/0091185 A1 | 7/2002 | Taylor et al. |
| 2002/0096278 A1 | 7/2002 | Foster |
| 2002/0123598 A1 | 9/2002 | Sieker |
| 2002/0130439 A1 | 9/2002 | Kroner |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas |
| 2003/0044513 A1 | 3/2003 | Shah |
| 2003/0066523 A1 | 4/2003 | Lewis |
| 2003/0071879 A1 | 4/2003 | Swenson |
| 2003/0116294 A1 | 6/2003 | Kehrer |
| 2003/0134945 A1 | 7/2003 | Capps |
| 2003/0148084 A1 | 8/2003 | Trocino |
| 2003/0153690 A1 | 8/2003 | Husemoen |
| 2003/0185991 A1 | 10/2003 | Wigger |
| 2003/0203117 A1 | 10/2003 | Bartkowiak |
| 2004/0002567 A1 | 1/2004 | Chen |
| 2004/0019168 A1 | 1/2004 | Soerens et al. |
| 2004/0024170 A1 | 2/2004 | Husemoen |
| 2004/0033269 A1 | 2/2004 | Hei |
| 2004/0033747 A1 | 2/2004 | Miller et al. |
| 2004/0034154 A1 | 2/2004 | Tutin |
| 2004/0038017 A1 | 2/2004 | Tutin et al. |
| 2004/0048531 A1 | 3/2004 | Belmares |
| 2004/0077055 A1 | 4/2004 | Fosdick et al. |
| 2004/0079499 A1 | 4/2004 | Dezutter |
| 2004/0087024 A1 | 5/2004 | Bellocq |
| 2004/0122166 A1 | 6/2004 | O—Brien-Bernini et al. |
| 2004/0131874 A1 | 7/2004 | Tutin |
| 2004/0144706 A1 | 7/2004 | Beaufils |
| 2004/0152824 A1 | 8/2004 | Dobrowolski |
| 2004/0161993 A1 | 8/2004 | Tripp |
| 2004/0209851 A1 | 10/2004 | Nelson |
| 2004/0213930 A1 | 10/2004 | Halabisky |
| 2004/0220368 A1 | 11/2004 | Li |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden |
| 2005/0001198 A1 | 1/2005 | Bytnar |
| 2005/0017394 A1 | 1/2005 | Hochsmann |
| 2005/0027283 A1 | 2/2005 | Richard |
| 2005/0033037 A1 | 2/2005 | Trusovs |
| 2005/0048212 A1 | 3/2005 | Clamen |
| 2005/0059770 A1 | 3/2005 | Srinivasan |
| 2005/0171085 A1 | 8/2005 | Pinto et al. |
| 2005/0196421 A1 | 9/2005 | Hunter et al. |
| 2005/0202224 A1 | 9/2005 | Helbing et al. |
| 2005/0208852 A1 | 9/2005 | Weber |
| 2005/0215153 A1 | 9/2005 | Cossement et al. |
| 2005/0245669 A1 | 11/2005 | Clungeon |
| 2005/0275133 A1 | 12/2005 | Cabell et al. |
| 2005/0288479 A1 | 12/2005 | Kuroda |
| 2006/0005580 A1 | 1/2006 | Espiard |
| 2006/0044302 A1 | 3/2006 | Chen |
| 2006/0099870 A1 | 5/2006 | Garcia et al. |
| 2006/0111480 A1 | 5/2006 | Hansen |
| 2006/0124538 A1 | 6/2006 | Morcrette |
| 2006/0135433 A1 | 6/2006 | Murray et al. |
| 2006/0141177 A1 | 6/2006 | Ligtenberg |
| 2006/0179892 A1 | 8/2006 | Horres |
| 2006/0188465 A1 | 8/2006 | Perrier |
| 2006/0198954 A1 | 9/2006 | Frechem |
| 2006/0231487 A1 | 10/2006 | Bartley |
| 2006/0252855 A1 | 11/2006 | Pisanova et al. |
| 2006/0281622 A1 | 12/2006 | Maricourt |
| 2007/0006390 A1 | 1/2007 | Clamen et al. |
| 2007/0009582 A1 | 1/2007 | Madsen et al. |
| 2007/0027281 A1 | 2/2007 | Michl |
| 2007/0027283 A1 | 2/2007 | Swift et al. |
| 2007/0039520 A1 | 2/2007 | Crews |
| 2007/0082983 A1 | 4/2007 | Crews |
| 2007/0123679 A1 | 5/2007 | Swift et al. |
| 2007/0123680 A1 | 5/2007 | Swift |
| 2007/0129522 A1 | 6/2007 | Burckhardt |
| 2007/0142596 A1 | 6/2007 | Swift |
| 2007/0158022 A1 | 7/2007 | Heep |
| 2007/0184740 A1 | 8/2007 | Keller |
| 2007/0191574 A1 | 8/2007 | Miller |
| 2007/0270070 A1 | 11/2007 | Hamed |
| 2007/0292618 A1 | 12/2007 | Srinivasan |
| 2007/0292619 A1 | 12/2007 | Srinivasan |
| 2007/0298274 A1 | 12/2007 | Eriksson |
| 2008/0009209 A1 | 1/2008 | Clamen |
| 2008/0051539 A1 | 2/2008 | Kelly |
| 2008/0060551 A1 | 3/2008 | Crews |
| 2008/0081138 A1 | 4/2008 | Moore |
| 2008/0108741 A1 | 5/2008 | Van Herwijnen et al. |
| 2008/0160260 A1 | 7/2008 | Wada |
| 2008/0160302 A1 | 7/2008 | Asrar |
| 2008/0194738 A1 | 8/2008 | Crews |
| 2009/0169867 A1 | 7/2009 | Kelly |
| 2009/0170978 A1 | 7/2009 | Kelly |
| 2009/0227732 A1 | 9/2009 | Glockner |
| 2009/0301972 A1 | 12/2009 | Hines |
| 2009/0304919 A1 | 12/2009 | Wagner |
| 2009/0306255 A1 | 12/2009 | Patel |
| 2009/0324915 A1 | 12/2009 | Swift |
| 2010/0029160 A1 | 2/2010 | Srinivasan |
| 2010/0058661 A1 | 3/2010 | Jackson |
| 2010/0080976 A1 | 4/2010 | Jackson |
| 2010/0084598 A1 | 4/2010 | Jackson |
| 2010/0086726 A1 | 4/2010 | Jackson |
| 2010/0087571 A1 | 4/2010 | Jackson |
| 2010/0098947 A1 | 4/2010 | Inoue |
| 2010/0129640 A1 | 5/2010 | Kelly |
| 2010/0130649 A1 | 5/2010 | Swift |
| 2010/0175826 A1 | 7/2010 | Huenig |
| 2010/0210595 A1 | 8/2010 | Wagner |
| 2010/0222463 A1 | 9/2010 | Brady |
| 2010/0222566 A1 | 9/2010 | Fosdick |
| 2010/0282996 A1 | 11/2010 | Jaffrennou |
| 2010/0301256 A1 | 12/2010 | Hampson |
| 2010/0320113 A1 | 12/2010 | Swift |
| 2011/0021672 A1 | 1/2011 | Crews |
| 2011/0039111 A1 | 2/2011 | Shooshtari |
| 2011/0040010 A1 | 2/2011 | Shooshtari |
| 2011/0042303 A1 | 2/2011 | Shooshtari |
| 2011/0045966 A1 | 2/2011 | Shooshtari |
| 2011/0089074 A1 | 4/2011 | Jackson |
| 2011/0135937 A1 | 6/2011 | Swift |
| 2011/0190425 A1 | 8/2011 | Swift |
| 2011/0220835 A1 | 9/2011 | Swift |
| 2011/0256790 A1 | 10/2011 | Toas |
| 2011/0260094 A1 | 10/2011 | Hampson |
| 2011/0262648 A1 | 10/2011 | Lee |
| 2011/0263757 A1 | 10/2011 | Rand |
| 2011/0306726 A1 | 12/2011 | Bailey |
| 2012/0133073 A1 | 5/2012 | Pacorel |
| 2012/0156954 A1 | 6/2012 | Eckert |
| 2013/0029150 A1 | 1/2013 | Appley |
| 2013/0032749 A1 | 2/2013 | Jaffrennou et al. |
| 2013/0047888 A1 | 2/2013 | Mueller |
| 2013/0059075 A1 | 3/2013 | Appley |
| 2013/0082205 A1 | 4/2013 | Mueller |
| 2013/0174758 A1 | 7/2013 | Mueller |
| 2013/0234362 A1 | 9/2013 | Swift |
| 2013/0236650 A1 | 9/2013 | Swift |
| 2013/0237113 A1 | 9/2013 | Swift |
| 2013/0244524 A1 | 9/2013 | Swift |
| 2014/0091247 A1 | 4/2014 | Jackson |
| 2014/0134909 A1 | 5/2014 | Guo et al. |
| 2014/0357787 A1 | 12/2014 | Jobber et al. |

FOREIGN PATENT DOCUMENTS

| | | |
|---|---|---|
| AU | 8538765 | 8/1985 |
| AU | 9640921 | 7/1997 |
| CA | 1090026 | 11/1980 |
| CA | 2037214 | 9/1991 |
| CA | 2232334 | 11/1998 |

| | | |
|---|---|---|
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 | 1/1982 |
| EP | 0099801 | 2/1984 |
| EP | 354023 | 2/1990 |
| EP | 0461995 | 12/1991 |
| EP | 0 524 518 | 7/1992 |
| EP | 0 547 819 | 12/1992 |
| EP | 0 583 086 | 7/1993 |
| EP | 0 672 720 | 3/1995 |
| EP | 0 714 754 | 6/1996 |
| EP | 0 826 710 | 8/1997 |
| EP | 796681 | 9/1997 |
| EP | 0 873 976 | 4/1998 |
| EP | 856494 | 8/1998 |
| EP | 878135 | 11/1998 |
| EP | 0 882 756 | 12/1998 |
| EP | 0 911 361 | 4/1999 |
| EP | 915811 | 5/1999 |
| EP | 936060 | 8/1999 |
| EP | 976866 | 2/2000 |
| EP | 0 990 729 | 4/2000 |
| EP | 1 038 433 | 9/2000 |
| EP | 1 193 288 | 9/2001 |
| EP | 1 225 193 | 7/2002 |
| EP | 1084167 | 9/2002 |
| EP | 1268702 | 1/2003 |
| EP | 1382642 | 1/2004 |
| EP | 1 486 547 | 6/2004 |
| EP | 1522642 | 4/2005 |
| EP | 1698598 | 9/2006 |
| EP | 1767566 | 4/2007 |
| EP | 2223941 | 9/2010 |
| EP | 2253663 | 11/2010 |
| FR | 2 614 388 | 10/1988 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2 078 805 | 1/1982 |
| GB | 2173523 | 10/1986 |
| GB | 2251438 | 7/1992 |
| JP | 53113784 | 10/1978 |
| JP | 57-101100 | 6/1982 |
| JP | 58-11193 | 1/1983 |
| JP | 61195647 | 8/1986 |
| JP | 3-173680 | 7/1991 |
| JP | 05186635 | 7/1993 |
| JP | 7-34023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002-293576 | 9/2002 |
| JP | 2003147276 | 5/2003 |
| JP | 2003238921 | 8/2003 |
| JP | 2004-60058 | 2/2004 |
| JP | 2005-306919 | 11/2005 |
| NZ | 549563 | 1/2008 |
| RU | 1765996 | 8/1995 |
| SU | 374400 | 3/1973 |
| WO | 9007541 | 7/1990 |
| WO | 9212198 | 7/1992 |
| WO | WO94/17004 | * 8/1994 ............. C03C 25/10 |
| WO | 9534517 | 12/1995 |
| WO | 9749646 | 12/1997 |
| WO | 9936368 | 7/1999 |
| WO | 99/47765 | 9/1999 |
| WO | 9960042 | 11/1999 |
| WO | 9960043 | 11/1999 |
| WO | 00/62628 | 10/2000 |
| WO | 0058085 | 10/2000 |
| WO | 0114491 | 3/2001 |
| WO | 0159026 | 8/2001 |
| WO | 0200429 | 1/2002 |
| WO | 03029496 | 4/2003 |
| WO | 03/071879 | 9/2003 |
| WO | 03106561 | 12/2003 |
| WO | 2004/076734 | 9/2004 |
| WO | 2005087837 | 9/2005 |
| WO | 2006/044302 | 4/2006 |
| WO | 2006/136614 | 12/2006 |
| WO | WO2007/014236 | 2/2007 |
| WO | WO2007/024020 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |

OTHER PUBLICATIONS

Ames, J. M., "The Maillard Browning Reaction—an Update", Chemistry & Industry, No. 17, 1988, 4 pages.

"Gamma-aminopropyltrimethoxysilane", Hawley's Condensed Chemical Dictionary, 14th Edition, John Wiley & Sons, Inc., 2002, 1 page.

English Translation of Japanese Abstract for 58011193, Jan. 21, 1983, 1 page.

English Translation of Japanese Abstract for 03173680, Jul. 26, 1991, 1 page.

English Translation of Japanese Abstract for 07034023, Feb. 3, 1995, 1 page.

English Translation of Russian Abstract for 374400, Mar. 20, 1973, 1 page.

English Translation of Japanese Abstract for 2004-60058, Feb. 26, 2004, 1 page.

English Translation of French Abstract for 2614388, Oct. 28, 1988, 1 page.

English Translation of Japanese Abstract for 2002-293576, Oct. 9, 2002, 2 pages.

English Translation of Japanese Abstract for 57-101100, Jun. 23, 1982, 1 page.

English Translation of European Abstract for 1038433, Sep. 27, 2000, 1 page.

International Search Report and Written Opinion for PCT/US2008/059730, completed Sep. 16, 2008.

Hodge, J.E., Chemistry of Browning Reactions in Model Systems,: 1953, J. Argic. Food Chem., vol. 1, No. 15, pp. 928-943.

International Search Report and Written Opinion for PCT/US2008/069046, completed Sep. 22, 2008.

International Search Report and Written Opinion for PCT/EP2008/060178, completed Oct. 14, 2008.

Office action for co-pending U.S. Appl. No. 12/524,512 (10 pages)—Mar. 23, 2016.

Office action for co-pending U.S. Appl. No. 12/524,539 (7 pages)—Mar. 23, 2016.

Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Decision of PTAB regarding Institution of Inter Partes Review for U.S. Pat. No. 8,114,210 (20 pages)—Oct. 21, 2015.
2nd Petition For Inter Partes Review of U.S. Pat. No. D631,670 (62 pages, filed Nov. 2, 2015 by Petitioners Johns Manville Corporation and Johns Manville, Inc.).
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9 , 2015.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision2 of PTAB regarding Institution of Inter Partes Review for U.S. Pat. No. D631,670 (27 pages)—May 9, 2016.
Office action for co-pending U.S. Appl. No. 14/649,277 (9 pages)—Jul. 22, 2016.
Decision re Opposition to AU 2006272595, issued from Australian Patent Office, Aug. 14, 2015, 25 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 0190802, issued by Eurasian Patent Office on Aug. 18, 2015, 15 pages.
Office action for co-pending U.S. Appl. No. 13/637,794 (8 pages)—Aug. 12, 2013.
Office action for co-pending U.S. Appl. No. 13/637,794 (9 pages)—Mar. 26, 2014.
Office action for co-pending U.S. Appl. No. 14/810,765 (7 pages)—Jan. 29, 2016.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB regarding Institution of Inter Partes Review for U.S. Pat. No. D631,670 (33 pages)—Jan. 12, 2016.
File Wrapper re U.S. Pat. No. 2,965,504—Part 1 (10 pages).
File Wrapper re U.S. Pat. No. 2,965,504—Part 2 (14 pages).
File Wrapper re U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Advisory Action in Ex Parte Reexamination of U.S. Pat. No. 7,854,980 (4 pages)—Nov. 18, 2015.
Office action for co-pending U.S. Appl. No. 12/524,502 (9 pages)—Sep. 21, 2012.
Office action for co-pending U.S. Appl. No. 12/524,502 (9 pages)—Apr. 4, 2013.
Office action for co-pending U.S. Appl. No. 13/696,452 (7 pages)—Jan. 13, 2015.
Office action for co-pending U.S. Appl. No. 13/696,452 (9 pages)—Oct. 27, 2015.
International Search Report for PCT/EP2008/060185, completed Oct. 23, 2008.
International Search Report for PCT/EP2011/057363, completed Sep. 5, 2011.
Agyei-Aye et al., "The Role of Anion in the the Reaction of Reducing Sugars with Ammonium Salts," Carbohydrates Research 2002, 337:2273-2277.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 22 pages.
Opposition to EP 1732968, Notice of Opposition: Prior Art, Scope of the Patent, Reasons for the Opposition, issued from European Patent Office, Mar. 8, 2012, 18 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry (IIC140593), p. 162, Mar. 21, 2009 (English Abstract).
Office action for co-pending U.S. Appl. No. 12/524,512 (7 pages)—Aug. 6, 2012.
Office action for co-pending U.S. Appl. No. 12/524,512 (9 pages)—Apr. 1, 2013.
Office action for co-pending U.S. Appl. No. 12/524,512 (14 pages)—Nov. 12, 2014.
Office action for co-pending U.S. Appl. No. 12/524,512 (9 pages)—Jul. 10, 2015.
Office action for co-pending U.S. Appl. No. 12/524,469 (7 pages)—Jun. 7, 2012.
Office action for co-pending U.S. Appl. No. 12/524,469 (8 pages)—Jan. 29, 2013.
Office action for co-pending U.S. Appl. No. 12/524,469 (7 pages)—Aug. 20, 2013.
Office action for co-pending U.S. Appl. No. 12/524,469 (9 pages)—Jun. 9, 2014.
Office action for co-pending U.S. Appl. No. 12/524,469 (9 pages)—Oct. 17, 2014.
Office action for co-pending U.S. Appl. No. 12/524,469 (9 pages)—Jul. 23, 2015.
Office action for co-pending U.S. Appl. No. 12/524,539 (13 pages)—Jun. 21, 2012.
Office action for co-pending U.S. Appl. No. 12/524,539 (13 pages)—Jun. 6, 2013.
Office action for co-pending U.S. Appl. No. 12/524,539 (12 pages)—Dec. 17, 2014.
Office action for co-pending U.S. Appl. No. 12/524,539 (7 pages)—Jul. 15, 2015.
Office action for co-pending U.S. Appl. No. 12/524,522 (4 pages)—Oct. 11, 2011.
Office action for co-pending U.S. Appl. No. 12/667,718 (5 pages)—Sep. 3, 2013.
Office action for co-pending U.S. Appl. No. 12/667,718 (6 pages)—Sep. 9, 2014.
Office action for co-pending U.S. Appl. No. 13/388,408 (5 pages)—Aug. 15, 2013.
Office action for co-pending U.S. Appl. No. 13/371,829 (9 pages)—Dec. 20, 2012.
Office action for co-pending U.S. Appl. No. 13/371,829 (6 pages)—Jul. 12, 2013.
Office action for co-pending U.S. Appl. No. 13/371,829 (6 pages)—Aug. 12, 2014.
Office action for co-pending U.S. Appl. No. 13/696,439 (11 pages)—Jan. 8, 2014.
Office action for co-pending U.S. Appl. No. 13/702,144 (6 pages)—Jan. 10, 2014.

Office action for co-pending U.S. Appl. No. 13/702,144 (7 pages)—Jul. 29, 2014.
Office action for co-pending U.S. Appl. No. 13/823,818 (9 pages)—Mar. 26, 2015.
Office action for co-pending U.S. Appl. No. 13/866,368 (16 pages)—Aug. 29, 2013.
Office action for co-pending U.S. Appl. No. 13/866,368 (11 pages)—Apr. 16, 2014.
Office action for co-pending U.S. Appl. No. 13/866,368 (8 pages)—Aug. 21, 2014.
Office action for co-pending U.S. Appl. No. 13/866,419 (14 pages)—Sep. 20, 2013.
Office action for co-pending U.S. Appl. No. 13/866,419 (10 pages)—Apr. 25, 2014.
Office action for co-pending U.S. Appl. No. 13/866,419 (8 pages)—Oct. 9, 2014.
Office action for co-pending U.S. Appl. No. 13/866,419 (8 pages)—Sep. 25, 2015.
Office action for co-pending U.S. Appl. No. 13/868,233 (23 pages)—Aug. 13, 2013.
Office action for co-pending U.S. Appl. No. 13/868,233 (12 pages)—Apr. 15, 2014.
Office action for co-pending U.S. Appl. No. 13/868,233 (8 pages)—Oct. 7, 2014.
Office action for co-pending U.S. Appl. No. 13/868,233 (8 pages)—Jul. 16, 2015.
Office action for co-pending U.S. Appl. No. 13/868,238 (8 pages)—Jul. 16, 2014.
Office action for co-pending U.S. Appl. No. 12/976,379 (7 pages)—Jan. 10, 2012.
Office action for co-pending U.S. Appl. No. 12/976,379 (6 pages)—Jul. 27, 2012.
Office action for co-pending U.S. Appl. No. 12/976,379 (9 pages)—Mar. 7, 2013.
Office action for co-pending U.S. Appl. No. 12/976,379 (8 pages)—Aug. 20, 2013.
Office action for co-pending U.S. Appl. No. 12/599,858 (8 pages)—May 11, 2011.
Office action for co-pending U.S. Appl. No. 13/341,542 (8 pages)—Dec. 26, 2012.
Office action for co-pending U.S. Appl. No. 13/341,542 (7 pages)—Feb. 10, 2014.
Office action for co-pending U.S. Appl. No. 14/026,394 (6 pages)—Aug. 14, 2014.
Office action for co-pending U.S. Appl. No. 14/272,556 (14 pages)—Nov. 20, 2014.
Office action for co-pending U.S. Appl. No. 14/272,556 (12 pages)—Sep. 17, 2015.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
Petition for Inter Partes Review of U.S. Pat. No. D631,670 (68 pages, filed Jun. 19, 2015 by Petitioners Johns Manville Corporation and Johns Manville, Inc.).
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Reveiw of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of 2015 U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of 2015 U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville Inc. in connection with 1st, 2nd and 3rd Petition for Inter Partes Review of U.S. Pat. No. 9,039,827, respectively).
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Decision of PTAB in Inter Partes Reexamination of U.S. Pat. No. 7,854,980 (25 pages)—Jul. 30, 2015.

\* cited by examiner

*Primary Examiner* — Shuangyi Abu Ali

(74) *Attorney, Agent, or Firm* — Knauf Insulation, Inc.; James K. Blodgett

(57) ABSTRACT

A method of manufacturing a mineral fiber thermal insulation product comprises the sequential steps of: Forming mineral fibers from a molten mineral mixture; spraying a substantially formaldehyde free binder solution on to the mineral fibers, the binder solution comprising: a reducing sugar, an acid precursor derivable from an inorganic salt and a source of nitrogen; Collecting the mineral fibers to which the binder solution has been applied to form a batt of mineral fibers; and Curing the batt comprising the mineral fibers and the binder which is in contact with the mineral fibers by passing the batt through a curing oven so as to provide a batt of mineral fibers held together by a substantially water insoluble cured binder.

51 Claims, 1 Drawing Sheet

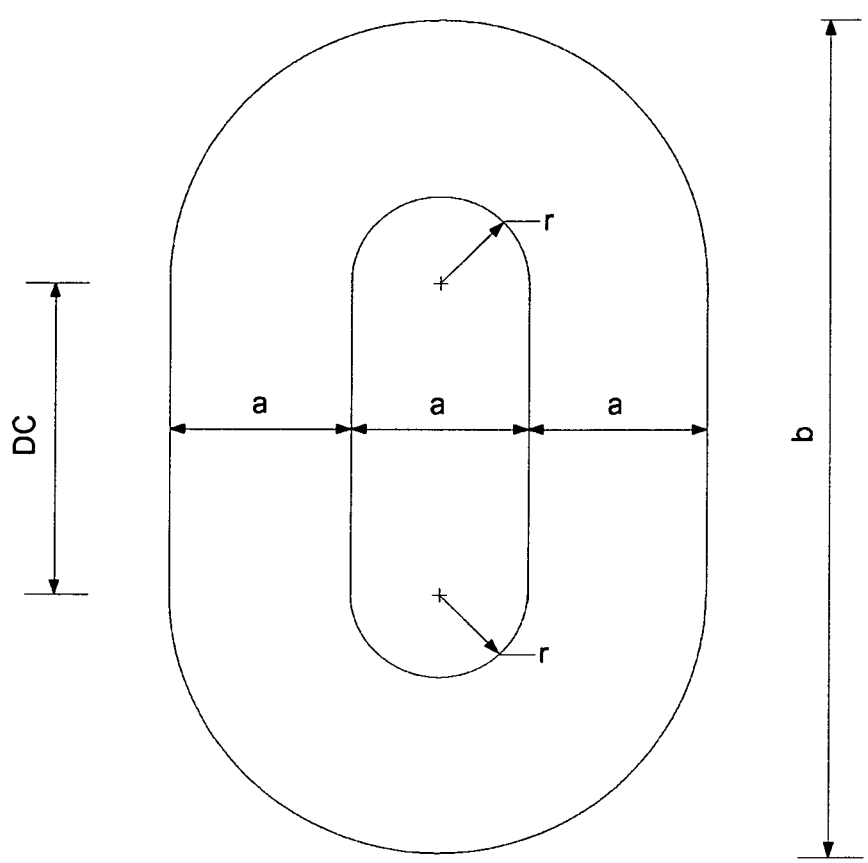

MINERAL WOOL INSULATION

This application is a U.S. national counterpart application of International Application Serial No. PCT/EP2008/060178, filed Aug. 1, 2008 under 35 USC §371, which claims priority to GB Patent Application Serial Number 0715100.4, filed Aug. 3, 2007, European GB Patent Application Serial Number 0807777.8, filed Apr. 29, 2008, and GB Patent Application Serial Number 0810297.2, filed Jun. 6, 2008, the entire disclosures of each of which are hereby incorporated herein by reference.

TECHNICAL FIELD

This invention relates to the manufacture of mineral wool insulation, for example glass wool or stone wool insulation, and to mineral wool insulation products.

BACKGROUND

WO 2007/014236 (incorporated herein by reference) discloses manufacture of mineral wool insulation products using binders which comprise Maillard reactants. One particular binder disclosed is based on a triammonium citrate-dextrose system derived from mixing dextrose monohydrate, anhydrous citric acid, water and aqueous ammonia. One of the many advantages of this binder system is that it is formaldehyde free.

SUMMARY

One aspect of the present invention provides a method of manufacturing a mineral fibre thermal insulation product in accordance with claim 1; further aspects of the inventions are defined in other independent claims. The dependent claims define alternative and/or preferred embodiments.

Binder solutions used in accordance with the present invention may be "substantially formaldehyde free", that is to say that they liberate less than 5 ppm formaldehyde as a result of drying and/or curing (or appropriate tests simulating drying and/or curing). Such binder solutions are preferably "formaldehyde free", that is the say they liberate less than 1 ppm formaldehyde in such conditions.

Insulation materials in accordance with the invention which incorporate binders may be "substantially formaldehyde free", that is to say that they comprise less than 5 ppm or less than detectable limits of free formaldehyde and/or consist of materials which together comprise less than these amounts of free formaldehyde and/or release levels of formaldehyde in standardised tests adapted to simulate their ordinary use which allows them to be classified as having no or undetectable levels of formaldehyde release. Preferably, such products release less than 10 µg/m$^3$, more preferably less than 5 µg/m$^3$ of formaldehyde during the period of 24-48 hours from the start of testing in accordance with ISO 16000.

BRIEF DESCRIPTION OF THE DRAWINGS

FIG. 1 shows a plan view of a mineral fibre test sample, where r is radius=12.7 mm, DC is distance between centers=44.5 mm, a=25.4 mm, and b=121 mm.

DETAILED DESCRIPTION

It has been found that insulation materials made according to the present invention may have at least equivalent and indeed improved properties compared to, for example, products made using the tri-ammonium citrate-dextrose system of WO 2007/014236. WO 2007/014236 teaches binder systems based, inter alia, on a combination of a carbohydrate (for example a reducing sugar), ammonia and a carboxylic acid and suggests that a Maillard type reaction may form the basis of the curing chemistry. It would have been thought that the nature of the acid used would have a significant effect upon the properties of the cured binder, particularly if the acid precursor and/or a derivative therefrom is incorporated into the structure of the cured binder. It is thus surprising that an acid precursor derivable from an inorganic salt should provide a suitable acid precursor in an otherwise apparently similar binder system.

Use of an acid precursor derivable from an inorganic salt may have significant advantages in terms of cost, availability and ease of handling. A particular advantage can be achieved by use of one or more inorganic ammonium salts, for example, an ammonium sulphate, an ammonium phosphate or an ammonium carbonate. An ammonium salt may provide the or part of the acid precursor and/or the or part of the source of nitrogen and/or the or part of a pH control system. An ammonium nitrate may also work; however, ammonium nitrate may oxidise aldehyde groups of the carbohydrate (for example in the case of dextrose) and/or require precautions to avoid explosions.

An ammonium sulphate is particularly advantageous but ammonium phosphate may be used in addition to or instead of this. Ammonium phosphate may be mono ammonium phosphate, di ammonium phosphate or tri ammonium phosphate; it may be an ammonium hydrogen phosphate. An ammonium carbonate, alone or in combination with the other materials disclosed herein, may also provide good results. The ammonium carbonate may be an ammonium bicarbonate.

The acid precursor, particularly when this consists essentially of inorganic ammonium salt(s), may make up
at least 5%, preferably at least 7%, more preferably at least 9% by dry weight of the uncured binder solution; and/or
less than 20%, preferably less than 18%, more preferably less than 16% by dry weight of the uncured binder solution.

The acid may comprise: a sulphuric acid, a phosphoric acid, a nitric acid or a weak acid.

The binder may comprise between 5%-25%, preferably 10% to 20%, more preferably 15% to 20% by dry weight of acid precursor (particularly where this is an inorganic ammonium salt) to carbohydrate (particularly when this is a sugar).

Where the binder comprises both an acid precursor derivable from an inorganic salt and an organic acid with the carbohydrate (particularly where this is a sugar), these may be present in the following amounts by dry weight with respect to the carbohydrate:

| | Preferred | More preferred | Most preferred |
|---|---|---|---|
| acid precursor derivable from an inorganic salt | At least 2.5% | At least 5% | |
| organic acid | At least 2.5% | At least 5% | |
| Combination of organic acid and acid precursor derivable from an inorganic salt | 5-25% | 10-20% | 15-20% |

Where an organic acid is used, this is preferably derived from an ammonium salt. For example, an ammonium citrate, particularly tri-ammonium citrate may be used as a source of citric acid.

Prior art phenol formaldehyde binder systems for mineral wool insulation have been used with the addition of about 2% by weight ammonium sulphate as a curing agent. However, the chemistry of such phenol formaldehyde binder systems is not comparable to the binder systems of the present invention which are not based on phenol and/or formaldehyde and/or on other phenolics.

A carbohydrate may be used in the binder solution rather than specifically a reducing sugar and may comprise a monosaccharide, for example in its aldose or ketose form. Preferably, the carbohydrate comprises a sugar, more preferably a reducing sugar or a reactant that yields a reducing sugar in situ under thermal curing condition; it may comprise glucose (ie dextrose). The carbohydrate may comprise a carbohydrate having a reducing aldehyde. It is believed that the use of a reducing sugar and particularly dextrose gives particularly good results for the manufacture of mineral wool insulation products. The dextrose need not be 100% pure but use of a material having a dextrose equivalent value of at least 0.85, preferably at least 0.9 and more preferably at least 0.95 is thought to be advantageous. The dextrose equivalent value DE can be thought of as i) a measure of de-polymerization and is roughly: DE=100/dp where dp stands for degree of polymerization or ii) the total amount of reducing sugars calculated as D-glucose (dextrose) on a dry basis.

Preferably, the binder solution and/or the binder is free or substantially free of starch; the presence of substantial quantities of starch is thought to increase the curing time and/or reduce the strength of the cured binder. The binder solution and/or the binder may be free or substantially free of proteins.

Industrial, non-food grade dextrose may be used as the reducing sugar; products such as Sirodex331 which is a 75% solids sugar solution obtainable from Tate and Lyle with a DE value of 94.5 may be used.

Particularly in the case where the reducing sugar consists essentially of dextrose and the acid precursor consists essentially of an ammonium salt, for example an ammonium sulphate, the ratio by dry weight of the amount of reducing sugar/the amount of acid precursor may be greater than or equal to 2.5 and/or less than or equal to 13.

The source of nitrogen may be an amine or an amine reactant; it may be derivable from the same source as the acid precursor, for example, from an inorganic ammonium salt. It is preferably ammonia in solution.

Precursors for and/or reactants which give the materials referred to may be used.

In one embodiment, the binder is derived essentially from a reducing sugar and an inorganic ammonium salt in aqueous solution.

In another embodiment, the binder may also comprise an organic acid, particularly a carboxylic acid; this may be a polycarboxylic acid, particularly a bi-carboxylic acid or tri-carboxylic acid, preferably citric acid; it is preferably monomeric. The combination of an organic acid (or a precursor a salt or an anhydride thereof) with an acid precursor derivable from an inorganic salt may present various advantages. Firstly, such a combination may reduce the risk of punking (which has been observed with such binders based solely on organic acids) whilst providing acceptable strength. Punking is a term of art in the mineral fibre insulation area which generally denotes a comparatively rapid oxidation of a binder with a concomitant generation of heat in a finished and generally packaged insulation product. Punking generally causes generation of fumes and discolouring of the insulation material. It may be associated with exothermic reactions which increase the temperatures through the thickness of the insulation material; this may destroy the integrity of the insulation product and/or present a fire hazard.

Alternatively or additionally, the combination of an organic acid (or a precursor, a salt or an anhydride thereof) with an acid precursor derivable from an inorganic salt may moderate acid conditions occurring during curing and thus reduce the risk or tendency of such conditions to cause significant damage to the material being bound. Such a combination may be particularly advantageous as a binder for stone wool insulation whose fibres may be more susceptible to potential damage by acid than, for example, glass wool insulation.

In a further embodiment, the binder is derived essentially from: a carbohydrate; an inorganic ammonium salt; and an organic acid and/or organic acid precursor; in aqueous solution.

The term "consist or consisting essentially of" is intended to limit the scope of a claim to the specified materials or steps and those that do not materially affect the basic and novel characteristic(s) of the claimed invention.

Binders which comprise or consist essentially of the components described herein may include additives, for example, additives selected from: silanes, mineral oils, coupling agents, silicones or siloxanes (particularly for water repellency), silicon containing compounds, surfactants, hydrophilic additives, hydrophobic additives, waxes, substances useful for controlling the pH (e.g. ammonium hydroxide) and ammonia. Ammonium hydroxide when used, and indeed other additives, may provide the and/or an additional source of nitrogen.

Preferably, the total quantity of additives (excluding ammonia) is less than 5% by weight (excluding the weight of water present), more preferably less than 3% or less than 2% by weight.

It is preferred to include a silane as an additive. The binder and/or binder solution may comprise at least 0.1% and/or less than 1% of a silane by dry weight. The silane may be amino substituted; it may be a silyl ether and it is believed that its presence may significantly improve the long term strength of the binder, particularly after weathering.

Preferences for the pH of the binder are:

|  | Preferred | More preferred | Most preferred |
| --- | --- | --- | --- |
| pH of binder | ≥7 | ≥8 | ≥9 | at least in the state in which the binder is applied to a material to be bound and/or recovered in a waste water recuperation system. Such a neutral or alkaline pH of the binder may alleviate problems of corrosion of manufacturing equipment which have been encountered with some essentially acidic prior art binder systems. Such prior art binders include binders consisting essentially of polyacrylic acids or polymer polycarboxylic acids. One particular advantage of the present invention is thus the use of a binder system that can operate in such neutral or alkaline conditions. When cured, the binder may become acidic during the curing process. However, equipment corrosion considerations are less significant in this case due to the minimal contact between the manufacturing equipment and the binder when in this state. The pH of the binder may be less than or equal to 13, preferably less than or equal to 12, 11 or 10. A preferred pH may be in the range of 7.5 to 9.5, particularly 8 to 9.

It is preferred to arrange the pH of the binder solution at an appropriate level to prevent precipitation of its constituents and particularly to ensure that the acid precursor derivable from an inorganic salt remains in solution. This is particularly the case where ammonium phosphate provides the acid precursor. Better dry and/or weathered strengths and/or more homogeneous products may be achieved by using homogeneous binder solutions comprising ammonium salt acid precursors which are free from precipitates, particularly when ammonium phosphate is used and the binder solution is free from phosphate precipitates.

The binder composition may be provided in the form of an aqueous solution; it may contain free ammonia or excess ammonia in solution. A neutral or alkaline pH of the binder may be generated by an excess of alkaline groups compared with acid groups present in the binder solution, for example, due partially or substantially to the presence of ammonia in the solution. Additional ammonia may be added to the binder solution, for example 0.2%-1% by weight, or indeed more; this may help to keep a wash water system used in the manufacture of mineral wool insulation alkaline over the long term.

When binder solution is sprayed on to hot mineral wool fibres just after they have been formed, the residual heat of the mineral wool fibres may cause a significant portion of any water in the binder solution to evaporate. Consequently, the mineral wool fibres which are then collected to form a batt may have binder present on them in the form of a sticky, viscous or tacky liquid. This may facilitate bonding between individual fibres via the binder.

One of the many advantages of this binder system is that it is sprayed onto the mineral wool fibers in a substantially unreacted state. The ability to spray the binder solution onto the mineral wool fibers in a substantially unreacted state may alleviate problems associated with pre-reacting the binder components in solution which have been encountered with some prior art binder systems in which the components are pre-reacted. Such prior art binders include binders consisting essentially of pre-reacted polymers or resins which are applied to the materials to be bound. With substantially unreacted binder present on the mineral wool fibers in the form of a sticky, viscous or tacky liquid, the reaction between the binder components may occur in a substantially dry state. One may describe the reaction as a bulk polymerization because it is occurring without the benefit of a solvent. A particular advantage of the present invention is thus the use of a binder system that can polymerise in a substantially dry state or through a bulk polymerisation.

The mineral fibres may be formed by internal or external spinning. They may have a temperature in the range 20° C. to 200° C., generally 30° C. to 100° C. or 150° C., when sprayed with the binder solution. The quantity of binder solution sprayed may be used with or without additional water sprays to assist in cooling the mineral fibres to a desired temperature between their formation and their collection to form a bat.

A particular advantage of using ammonia in solution to control the pH of the binder solution applied to the mineral fibres is that at least part of the ammonia of binder solution that sticks to the fibres may flash off due to the residual heat of the mineral wool fibres. Consequently, the binder solution that coats the fibres may have a lower pH than the binder solution sprayed.

The binder may be curable; it may be cured, for example in a curing oven; it may form a thermoset binder. In its cured form, the binder may: comprise melanoidins; and/or be thermoset; and/or be water insoluble or substantially water insoluble. The binder solution may be substantially colourless or white to off-white; upon curing, the binder may take on a dark colour, particularly a dark brown colour. The cured product may be dark in colour, particularly dark brown in colour. The binder may be free of proteins; it may be free of cellulosic feedstock. One of the many advantages of this binder system is that the extent of curing can be determined by the colour. Substantially dehydrated binder appears white or off-white. Progressively cured to a greater extent, the binder appears progressively darker in colour (a darker shade of brown). When applied to mineral fibers, the extent to which the mineral wool insulation has cured can be determined by its colour.

When applied to the mineral fibres and/or prior to passing through the curing oven, the binder may be free or substantially free of melanoidins and/or other reaction products derived from curing. Curing of the binder may produce glucosylamine, particularly as an intermediate product. Consequently, a cured or particularly a partially cured product may comprise glucosylamine.

The reaction of the binder upon curing may be essentially a Maillard type reaction as described for example in US Patent Application 20070027283 or WO2007/14236. The binder may comprise polymerisation products of a mixture that comprises a reducing sugar and a material selected from the group consisting of ammonium sulphate, ammonium phosphate, ammonium nitrate and ammonium carbonate.

The binder solution may be formulated by combining:
A carbohydrate, preferably a reducing sugar;
An acid precursor derivable from an inorganic salt, preferably an ammonium sulphate or ammonium phosphate;
A source of nitrogen; and
water.

The formulation may comprise optional or additional ammonia provided in the form of an aqueous ammonia solution. The water may comprise wash water.

Forming the binder solution from a carbohydrate and an acid precursor comprising an inorganic ammonium salt provides one particular advantageous preparation method. This may be achieved in a simple mixing chamber which may be open and/or at atmospheric pressure. The carbohydrate and/or the acid precursor may be added in powder or liquid form. The preparation is preferably carried out at room temperature. Preferably it is not necessary to supply heat to prepare the binder solution; nevertheless, the binder solution may be heated during its preparation, for example to a temperature with the range 20° C. to 80° C., particularly where this facilitates dissolving and/or mixing of its ingredients.

The binder solution may comprise:
at least 5% 10%, 15% or 18% solids and/or
less than 50%, 40% or 20% solids particularly determined as bake out solids by weight after drying at 140° C. for 2 hours.

The binder solution and/or the binder are preferably organic.

The mineral fibre insulation may be shaped and/or dimensioned and/or moulded with the aid of the binder.

The binder solution, particularly when applied to the mineral fibres, may have a viscosity appropriate for application by spraying or pouring. Its viscosity at 20° C. may be:
Less than about 1.5 Pa·s, preferably less than about $1 \times 10^{-2}$ Pa·s; and/or
Greater that about $2 \times 10^{-4}$ Pa·s, preferably greater than about $5 \times 10^{-4}$ Pa·s Curing of the binder may occur in a curing oven, for example using forced hot air circulation; it may occur in a press. Curing may comprise a dehydration of the binder; it may comprise a polymerisation. Curing may comprise a bulk polymerisation reaction. Curing may be carried out for duration of 20 minutes or less, preferably 10 minutes or less. Curing of the binder preferably occurs when the binder solution (from which water may have been evaporated) is in contact with the mineral fibres; it may occur at substantially atmospheric pressure. The curing may be a substantially dry curing, that is to say by application of dry heat and/or substantially dry or heated atmospheric air rather than using steam or heated water vapour.

The curing temperature and time may be selected as a function of the product density and/or thickness. The curing oven in such cases may have a plurality of heating zones having temperatures within the range 200° C. to 350° C. (typically 230° C. to 300° C.). A thin, low density product (12 kg/m$^3$ or less) may be cured by passing through the curing oven in as little as 20 seconds; a thick, high density product (80 kg/m$^3$ or more) may require a passage of 15 minutes or more in the curing oven. The product may reach a temperature in the range 180° C.-220° C. during the curing process.

The cured binder may comprise greater than 2% and/or less than 8% nitrogen by mass as determined by elemental analysis.

The binder in its uncured state may comprise the following levels of sulphates, phosphates carbonates and/or nitrates by dry weight:
  Greater than 2.5%, 3% or 5%; and/or
  Less than 25%, 22%, or 20%

Finished materials manufactured using binder systems according to the present invention may have residual levels of sulphates, phosphates, carbonates and/or nitrates derived notably from the inorganic salt serving as the acid precursor. Such species may be present in the following quantities:
  Greater than 500, 750, 1000 or 1500 mg/kg; and/or
  Less than 5000, 4000 or 3000 mg/kg.

The presence of such species may be assessed in a leach test and provide an indication in the final product of the binder system used.

The quantity of binder in the finished product may be:
  Greater than: 1%, 2%, 2.5%, 3%, 3.5% or 4%; and/or
  Less than: 20%, 15%, 10% or 8%
measured by dry weight of the finished product.

The mineral wool insulation may have one or more of the following parting strengths:
  Ordinary Parting Strength of
  At least 120 g/g, preferably at least 150 g/g; and/or
  Less than 400 g/g
  Weathered Parting Strength of
  At least 120 g/g, preferably at least 150 g/g; and/or
  Less than 400 g/g
  % loss between Ordinary and Weathered Parting Strength of
  Less than 10%, preferably less than 5%

The mineral wool insulation may have one or more of the following characteristics:
  A density greater than 5, 8 or 10 kg/m$^3$;
  A density less than 200, 180 or 150 km/m$^3$
  Comprise glass wool fibres and have a density greater than 5, 8 or 10 kg/m$^3$ and/or less than 80, 60 or 50 kg/m$^3$;
  Comprise stone wool fibres and have a density greater than 15, 20 or 25 kg/m$^3$ and/or less than 220, 200 or 180 kg/m$^3$;
  A thermal conductivity λ of less than 0.05 W/mK and/or greater than 0.02 W/mK
  Comprise less than 99% by weight and/or more than 80% by weight mineral fibres.
  A thickness of greater than 10 mm, 15 mm or 20 mm and/or less than 400 mm, 350 mm or 300 mm.

Embodiments of the invention will now be described by way of example with reference to FIG. 1 which is a plan view of a test sample.

Shell Bone Testing:
  Binders were prepared as aqueous solutions by
    combining the ingredients of a desired binder formulation in an open, unheated reaction vessel
    adding distilled water
    subsequently adding a silane solution
    agitating during addition of liquids and afterwards for several minutes to achieve complete dissolution of solids
  such that the binder solution contained approximately 45% dissolved solids as a percentage of total weight of solution. A 2-g sample of this solution, upon thermal curing at about 200° C. to 210° C. for 8 minutes, would yield 30% solids (the weight loss being attributed to dehydration during thermoset binder formation).

An evaluation of dry and "weathered" tensile strength of glass bead-containing shell bones provided an indication of the likely tensile strength and the likely durability of fibreglass insulation or other materials prepared with that particular binder. Predicted durability is based on the ratio of a shell bone's weathered tensile strength to its dry tensile strength.

To prepare the shell bones, an electric mixer was used for about two minutes to mix approximately 75 g of binder with 727.5 g of glass beads (equivalent to Quality Ballotini Impact Beads, Spec. AD, US Sieve 70-140, 106-212 micron-#7, from Potters Industries, Inc.). Any clumps from the sides of the mixer whisk and from the sides and bottom of the mixing bowl were mixed in manually using a spatula about half way through the mixing and also at the end of the mixing.

The prepared glass beads/binder mixture was added to the mould cavities of a shell bone mould (Dietert Foundry Testing Equipment; Heated Shell Curing Accessory, Model 366) which had been pre-heated to about 218° C. (425° F.). The surface of the mixture in each cavity was flattened out, while scraping off the excess mixture to give a uniform surface area to the shell bone. Any inconsistencies or gaps that existed in any of the cavities were filled in with additional glass beads/binder mixture and then flattened out. The top platen was quickly placed onto the bottom platen (to avoid producing shell bones with two differentially cured layers). The cured shell bones were removed after seven minutes, cooled to room temperature on a wire rack, labelled and placed individually in plastic storage bags. If shell bones could not be tested on the day they were prepared, the shell bone-containing plastic bags were placed in a dessiccator unit. During curing the temperature of the bottom platen ranged from about 204° C. to about 221° C. (about 400° F. to about 430° F.), while the temperature of the top platen ranged from about 227° C. to about 243° C. (about 440° F. to about 470° F.).

Procedure for Testing Breaking Strength:
  Equipment: 5500 R Instron machine
  Immediately prior to testing, each shell bone was removed from is plastic bag and its weight and thickness recorded.

Weathering Procedure for Shell Bones:

16 hours weathering in a pre-heated humidity chamber (65° C., 95% relative humidity)

upon removal shell bones were sealed in individual plastic storage bags and taken immediately for testing.

Procedure for Measuring Gel Time:

A small amount of binder (2.0 ml) is added to the centre of a hot plate set to 150° C. and a stop watch is started. The binder is worked with a spatula until it is possible to draw the sample into a long string. The time taken from the addition of the binder to the string formation is the gel time.

Binder Formulations Tested—Inorganic Acid Precursors Compared with Citric Acid:

| Test ref: | Binder formulation (by dry weight) |
|---|---|
| A | 85% DMH + 15% CA + 4.8% NH4OH + 0.3% ISI0200 |
| B | 90% DMH + 10% AmSO4 + 4.8% NH4OH + 0.3% ISI0200 |
| C | 85% DMH + 15% AmSO4 + 4.8% NH4OH + 0.3% ISI0200 |
| D | 80% DMH + 20% AmSO4 + 4.8% NH4OH + 0.3% ISI0200 |
| E | 90% DMH + 10% AmPO4 + 4.8% NH4OH + 0.3% ISI0200 |
| F | 85% DMH + 15% AmPO4 + 4.8% NH4OH + 0.3% ISI0200 |
| G | 80% DMH + 20% AmPO4 + 4.8% NH4OH + 0.3% ISI0200 |

Binder Formulations Tested—Combined Inorganic Acid Precursor and Citric Acid Compared with Citric Acid Alone and Inorganic Acid Precursor Alone:

| Test ref: | Binder formulation (by dry weight) |
|---|---|
| H | 85% DMH + 15% CA + 4.8% NH4OH + 0.3% ISI0200 |
| I | 85% DMH + 10% CA + 5% AmSO4 + 4.8% NH4OH + 0.3% ISI0200 |
| J | 85% DMH + 5% CA + 10% AmSO4 + 4.8% NH4OH + 0.3% ISI0200 |
| K | 85% DMH + 15% AmSO4 + 4.8% NH4OH + 0.3% ISI0200 |

Key:
DMH = Dextrose monohydrate
CA = citric acid
NH4OH = ammonium hydroxide
ISI0200 = silane
AmSO4 = ammonium sulphate
AmPO4 = ammonium phosphate Test Results—Inorganic Acid Precursors Compared with Citric Acid:

| Test ref | Dry breaking strength (MN/m$^2$) | Weathered breaking strength (MN/m$^2$) | Loss in breaking strength from weathering/% | Gel time of binder solution (s) | pH of binder solution just before mixing with beads |
|---|---|---|---|---|---|
| A | 1.455 | 1.567 | −7.70 | 343 | 9.54 |
| B | 1.271 | 0.895 | 29.57 | 280 | 10.28 |
| C | 1.550 | 0.856 | 44.79 | 362 | 10.24 |
| D | 1.877 | 1.156 | 38.39 | 327 | 10.13 |
| E | 1.499 | 1.069 | 28.68 | 356 | 10.18 |
| F | 1.281 | 0.848 | 33.82 | 334 | 9.99 |
| G | 1.123 | 0.801 | 28.74 | 287 | 9.73 |

Test Results—Combined Inorganic Acid Precursor and Citric Acid Compared with Citric Acid Alone and Inorganic Acid Precursor Alone:

| Test ref | Dry breaking strength (MN/m$^2$) | Weathered breaking strength (MN/m$^2$) | Loss in breaking strength from weathering/% | Gel time of binder solution (s) | pH of binder solution just before mixing with beads |
|---|---|---|---|---|---|
| H | 1.69 | 1.50 | 11.32 | 363 | 9.39 |
| I | 1.50 | 1.18 | 21.37 | 341 | 9.71 |
| J | 1.21 | 1.05 | 13.19 | 375 | 9.99 |
| K | 1.47 | 1.02 | 30.33 | 376 | 9.97 |

Results from tests carried out together (test A to G were carried out in one session and tests H to K carried out during another session) provide a useful indication of results relative to other results obtained during the same test session. It may not be reliable to compare tests results from different test sessions.

First Comparative Testing on Insulation Product:

Comparative testing of binder systems on a mineral fibre insulation product gave the following results:

| Binder tested | Description | Formulation |
|---|---|---|
| PF1 | Comparative example - standard phenol formaldehyde binder | Resin, Urea, Lignin, Ammonia, Silane |
| AC1 | Comparative example - ammonium citrate based binder | Dextrose 85% Citric Acid 15% Ammonia 4.8% Silane 0.3% |
| Ex1 | Example 1 of the present invention | Dextrose 85% Ammonium Sulphate 15% Ammonia 4.8% Silane 0.3% |
| Product used for test: | glass wool fibre insulation product, nominal density 16 kg/m$^3$, nominal thickness 75 mm, nominal width 455 mm | |

Binder Content of Test Product LOI (Loss on Ignition) % Weight:

| Binder | Mean LOI |
|---|---|
| PF1 | 6.22% |
| AC1 | 6.91% |
| Ex1 | 6.78% |

Drape Test (Mean Average in mm Measured after the Periods Specified):

| Binder | Day 1 | Week 1 | Week 3 | Week 6 |
|---|---|---|---|---|
| PF1 | 55 | 68 | 60 | 71 |
| AC1 | 83 | 99 | 80 | 72 |
| Ex1 | 66 | 76 | 66 | 75 |

Thickness (Mean Average in mm Measured after the Periods Specified in accordance with British Standard BS EN 823: 1995)

| Binder | Day 1 | Week 1 | Week 3 | Week 6 |
|---|---|---|---|---|
| PF1 | 76.4 | 75.1 | 75.1 | 75.2 |
| AC1 | 75.3 | 73.6 | 72.5 | 74 |
| Ex1 | 76 | 76.7 | 74.9 | 74.3 |

Density (Mean Average in kg/m³ Measured After the Periods Specified)

| Binder | Day 1 | Week 1 | Week 3 | Week 6 |
|---|---|---|---|---|
| PF1 | 16.44 | 16.7 | 16.35 | 16.44 |
| AC1 | 16.68 | 16.41 | 16.33 | 16.48 |
| Ex1 | 16.5 | 16.9 | 16.5 | 16.5 |

Quantity of Sulphates Present mg/kg

| Binder | Sample 1 | Sample 2 |
|---|---|---|
| AC1 | 240 | 240 |
| Ex1 | 2000 | 2200 |

Parting Strength (g/g)

| Binder | Ordinary | Weathered | % loss |
|---|---|---|---|
| PF1 | 248 | 107 | 56.85 |
| AC1 | 230 | 199 | 13.47 |
| Ex1 | 196 | 189 | 3.57 |

Test Procedures:
Binder Content LOI (Loss on Ignition)

A weighed sample of wool plus binder is placed in a muffle furnace set to 550° C. After a set time the wool is removed from the furnace, placed in a desiccator to cool and re-weighed. The weight loss is expressed as a percentage of the original sample weight and is known as the binder content or Loss On Ignition (LOI).

Drape Test

A single batt (or slab) is placed across two poles (each 500 mm long, 20 mm diameter) set into a wall 1 meter apart. The degree of sag in the centre of the batt is recorded. This is repeated for all of the batts in a pack and for several packs. Packs are measured at set points over a period of time to determine the long term effects of compression on the batts.

Density: Measured for the Samples Subjected to the Drape Test

Quantity of sulphates present: leaching test for granular wastes in water with eluate analysis according to British standard BS EN 12457-2 at L/S10

Parting Strength

The parting strength is expressed in grams/gram being the total breaking load of six test specimens divided by their total weight.

The test is carried out on mineral fibre mats as received for testing (Ordinary Parting Strength) and after an accelerated weathering test as explained below (Weathered Parting Strength).

A first set of six samples of the form and dimensions shown in FIG. 1 are cut from the mineral fibre mat to be tested. The dimensions are:

r: radius 12.7 mm;
DC: distance between centres 44.5 mm;
a: 25.4 mm;
b: 121 mm.

The long axis of the samples should be parallel to the conveyor direction and the samples should be taken across the full width of the mineral mat. A second set of six samples is then taken in the same way.

The total weight of the first group of six samples W1 in grams is recorded. The total weight of the second group of six samples W2 in grams is recorded; these samples are then placed in a preheated autoclave and conditioned on a wire mesh shelf away from the bottom of the chamber under wet steam at 35 kN/m² for one hour. They are then removed, dried in an oven at 100° C. for five minutes and tested immediately for parting strength.

To test the parting strength, each sample is mounted in turn on the jaws of a 5500 Instron tensile strength machine and the maximum breaking load in grams or Newtons is recorded. If the breaking load is measured in Newtons it is converted to grams by multiplying it by 101.9. Six results in grams are obtained for each set of samples: G1 G2 G3 G4 G5 and G6 for the first set of samples and G7 G8 G9 G10 G11 and G12 for the second set of samples. The Ordinary Parting Strength is calculated from the first set of samples using the formula Ordinary Parting Strength=(G1+G2+G3+G4+G5+G6)/W1.

The Weathered Parting Strength is calculated from the second set of samples using the formula Weathered Parting Strength=(G7+G8+G9+G10+G11+G12)/W2.

Second Comparative Testing on Insulation Product:

| Product used for test: | glass wool fibre insulation product, nominal density 7.2 kg/m³, nominal thickness 159 mm |
|---|---|

Samples: The Following Samples of Fibreglass Batts were Tested:

| Example | Binder Description | Target binder content (LOI) for product |
|---|---|---|
| PF2 | standard phenol formaldehyde binder of Resin, Urea, Ammonia, Silane | 4.5% |
| 2.1 | Dextrose 85% Ammonium Sulphate 15% Silane 0.3% (10.6% solids in binder solution) | 4.5% |
| 2.2 | Dextrose 85% Ammonium Sulphate 15% Silane 0.3% Norjohn oil (11.4% solids in binder solution) | 4.5% |
| 2.3 | Dextrose 85% Ammonium Sulphate 15% Silane 0.3%, 2.4% NH3 (10.6% solids in binder solution) | 4.5% |
| 2.4 | Dextrose 85% Ammonium Sulphate 15% Silane 0.3%, 2.4% NH3 (10.6% solids in binder solution) | 6.0% |

Results

|  | PF2 | 2.1 | 2.2 | 2.3 | 2.4 |
|---|---|---|---|---|---|
| Recovery | 158 mm | 157 mm | 163 mm | 160 mm | 166 mm |
| Recovery. % nominal | 99.4% | 99.0% | 102.8% | 100.6% | 104.8% |
| Parting Strength (ASTM C-686) | 190.8 g/g | 131.7 g/g | 146.7 g/g | 159.9 g/g | 143.9 g/g |
| Parting strength after | 145.9 g/g | 100.0 g/g | 110.3 g/g | 124.9 g/g | 114.3 g/g |

| | PF2 | 2.1 | 2.2 | 2.3 | 2.4 |
|---|---|---|---|---|---|
| weathering (ASTM C-686 following conditioning for 7 days at 90° F., 90% relative humidity) | | | | | |

What is claimed is:

1. A method of manufacturing a glass fibre thermal insulation product which comprises less than 99% by weight and more than 80% by weight glass fibres and has a density greater than 5 kg/m$^3$ and less than 80 kg/m$^3$, the method comprising sequentially:
   forming glass fibres from a molten mineral mixture;
   spraying a substantially formaldehyde-free binder solution onto the glass fibres;
   collecting the glass fibres to which the binder solution has been applied to form a batt of glass fibres; and
   curing the batt comprising the glass fibres and the binder by passing the batt through a curing oven so as to provide a batt of glass fibres held together by a cured, thermoset, substantially formaldehyde-free, nitrogenous polymer-containing binder,
   wherein the binder solution consists essentially of (i) a carbohydrate reactant comprising a reducing sugar or a carbohydrate reactant that yields a reducing sugar in situ under thermal curing conditions and (ii) an acid precursor, in aqueous solution,
   wherein the acid precursor provides (i) ionic species selected from the group consisting of sulphates, phosphates, nitrates and combinations thereof and ii) an amine or amine reactant.

2. The method of claim 1, in which wash water is sprayed onto the glass fibres between their formation and their collection to form a batt, at least a part of the wash water having been sprayed onto glass fibres and subsequently returned to a wash water system to be reused as wash water.

3. The method of claim 1, in which the binder solution is sprayed onto the glass fibres when the glass fibres are at a temperature of between 30° C. and 150° C.

4. The method of claim 1, in which curing of the binder is carried out by passing the batt through at least one zone of a curing oven at a temperature within the range 230° C.—300° C. with an oven residence time in the range 30 seconds to 20 minutes.

5. The method of claim 1, in which the binder solution has a pH of greater than 7 when sprayed onto the glass fibres.

6. The method of claim 1, in which the acid precursor makes up between 5% and 25% by dry weight of the binder solution.

7. The method of claim 1, in which the acid precursor comprises an inorganic salt.

8. The method of claim 1, in which the carbohydrate reactant of the binder solution comprises a reducing sugar which has a dextrose equivalent value of at least 0.85.

9. The method of claim 1, in which the carbohydrate reactant of the binder solution consists essentially of dextrose.

10. The method of claim 1, in which the binder solution comprises a silicon containing compound.

11. The method of claim 1, in which the binder solution comprises a material selected from the group consisting of a polycarboxylic acid, a salt of a polycarboxylic acid, and an anhydride of a polycarboxylic acid.

12. The method of claim 1, in which the binder solution comprises excess ammonia.

13. The method of claim 12, in which the binder solution has a pH which, in its conditions of use, prevents precipitation of sulphates or phosphates.

14. The method of claim 1, in which there is at least 7% by dry weight of the acid precursor with respect to reducing sugar.

15. The method of claim 1, in which the ratio by dry weight of reducing sugar to acid precursor (expressed as dry weight of reducing sugar/dry weight of acid precursor) is in the range 2.5 to 13.

16. The method of claim 1, in which the cured binder comprises melanoidins.

17. The method of claim 1, in which the quantity of binder in the glass fibre thermal insulation product is greater than 1% and less than 15% measured by dry weight of the glass fibre thermal insulation product.

18. The method of claim 1, wherein the glass fibre thermal insulation product comprises residual levels of more than 500 mg of ionic species per kg of product, said species selected from the group consisting of sulphates, phosphates, nitrates and combinations thereof, in which the residual levels are assessed in a leach test.

19. The method of claim 1, wherein the glass fibre thermal insulation product comprises residual levels of more than 750 mg of ionic species per kg of product, said species selected from the group consisting of sulphates, phosphates, nitrates and combinations thereof, in which the residual levels are assessed in a leach test.

20. The method of claim 1, wherein the glass fibre thermal insulation product comprises residual levels of less than 5000 mg of ionic species per kg of product, said species selected from the group consisting of sulphates, phosphates, nitrates and combinations thereof, in which the residual levels are assessed in a leach test.

21. The method of claim 1, in which the cured binder is substantially water insoluble.

22. The method of claim 1, in which the cured binder has a dark brown color.

23. The method of claim 1, in which the cured binder comprises greater than 2% nitrogen by mass.

24. The method of claim 1, in which the cured binder comprises less than 8% nitrogen by mass.

25. The method of claim 1, in which the reaction of the binder upon curing is essentially a Maillard type reaction.

26. The method of claim 1, in which the binder solution as sprayed onto the glass fibres comprises at least 5% solids.

27. The method of claim 1, in which the binder solution as sprayed onto the glass fibres comprises at least 10% solids.

28. The method of claim 1, in which the binder solution as sprayed onto the glass fibres comprises levels of sulphates, phosphates, nitrates, or combinations thereof by dry weight that are greater than 2.5%.

29. The method of claim 1, in which the binder solution as sprayed onto the glass fibres comprises levels of sulphates, phosphates, nitrates, or combinations thereof by dry weight that are greater than 3%.

30. The method of claim 1, in which the binder solution as sprayed onto the glass fibres comprises levels of sulphates, phosphates, nitrates, or combinations thereof by dry weight that are greater than 5%.

31. The method of claim 1, in which the binder solution as sprayed onto the glass fibres comprises less than 40% solids.

32. The method of claim 1, in which the binder solution as sprayed onto the glass fibres comprises levels of sulphates, phosphates, nitrates, or combinations thereof by dry weight that are less than 25%.

33. The method of claim 1, in which the acid precursor comprises an ammonium salt.

34. The method of claim 1, in which the glass fibre thermal insulation product has an Ordinary Parting Strength of at least 120 g/g and less than 400 g/g.

35. The method of claim 1, in which the spraying of substantially formaldehyde-free aqueous binder solution onto the glass fibres comprises spraying the substantially formaldehyde-free aqueous binder solution onto the glass fibres just after the glass fibres have been formed so that the residual heat from the glass fibres causes a significant portion of the water in the aqueous binder solution to evaporate.

36. The method of claim 1, in which glass fibres are formed by internal spinning.

37. The method of claim 1, in which the glass fibre thermal insulation product has i) an ordinary parting strength which is at least 120 g/g and less than 400 g/g and ii) a weathered parting strength which is at least 120 g/g and less than 400 g/g.

38. The method of claim 1, in which the glass fibre thermal insulation product has a thickness of greater than 15 mm and less than 350 mm.

39. The method of claim 1, in which the glass fibre thermal insulation product has a thermal conductivity $\lambda$ of less than 0.05 W/mK and greater than 0.02 W/mK.

40. The method of claim 1, further comprising compressing the cured bans in a pack.

41. The method of claim I, wherein the binder solution includes at least one additive selected from: silanes, mineral oils, coupling agents, silicones, siloxanes, surfactants, hydrophilic additives, hydrophobic additives and waxes.

42. The method of claim 41, wherein the total quantity of the additives is less than 5% by weight excluding the weight of water present.

43. The method of claim 1, wherein the binder solution comprises between 0.1% and 1% of a silane or silicon-containing coupling agent calculated as dissolved binder solids.

44. A method of manufacturing a glass fibre thermal insulation product which comprises less than 99% by weight and more than 80% by weight glass fibres and has a density greater than 5 kg/m$^3$ and less than 80 kg/m$^3$, the method comprising sequentially:
   forming glass fibres from a molten mineral mixture;
   spraying a substantially formaldehyde-free aqueous binder solution onto the glass fibres just after they have been formed so that the residual heat from the glass fibres causes a significant portion of the water in the aqueous binder solution to evaporate;
   collecting the glass fibres to which the binder solution has been applied to form a batt of glass fibres; and
   curing the batt comprising the glass fibres and the binder by passing the batt through a curing oven for a duration of 20 minutes or less using forced hot air convection so as to provide a batt of glass fibres held together by a cured, thermoset, substantially formaldehyde-free, nitrogenous polymer-containing binder,
   wherein the binder solution consists essentially of (i) a carbohydrate reactant comprising a reducing sugar or a carbohydrate reactant that yields a reducing sugar in situ under thermal curing conditions and (ii) an acid precursor, in aqueous solution;
   wherein the acid precursor makes up at least 7% by dry weight of the uncured binder solution,
   and wherein the acid precursor provides (i) ionic species comprising sulphates and/or phosphates and ii) an amine or amine reactant.

45. The method of claim 44, in which the ratio by dry weight of the reducing sugar to the acid precursor (expressed as dry weight of reducing sugar/ dry weight of acid precursor) is in the range 2.5 to 13.

46. The method of claim 44, further comprising compressing the cured bans in a pack.

47. The method of claim 44, in which the acid precursor comprises an ammonium salt.

48. The method of claim 47, wherein the ammonium salt comprises an ammonium sulphate salt.

49. The method of claim 47, wherein the ammonium salt comprises an ammonium phosphate salt.

50. The method of claim 33, wherein the ammonium salt comprises an ammonium sulphate salt.

51. The method of claim 33, wherein the ammonium salt comprises an ammonium phosphate salt.

* * * * *